United States Patent
Fujiwara et al.

(10) Patent No.: US 11,320,805 B2
(45) Date of Patent: May 3, 2022

(54) CONTROL DEVICE FOR ELECTRIC MOTOR

(71) Applicant: Panasonic Intellectual Property Management Co., Ltd., Osaka (JP)

(72) Inventors: Hiroshi Fujiwara, Osaka (JP); Toru Tazawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 159 days.

(21) Appl. No.: 16/955,131

(22) PCT Filed: Dec. 19, 2018

(86) PCT No.: PCT/JP2018/046683
§ 371 (c)(1),
(2) Date: Jun. 18, 2020

(87) PCT Pub. No.: WO2019/138808
PCT Pub. Date: Jul. 18, 2019

(65) Prior Publication Data
US 2020/0319622 A1  Oct. 8, 2020

(30) Foreign Application Priority Data
Jan. 9, 2018 (JP) .............................. JP2018-000989

(51) Int. Cl.
*G05B 19/416* (2006.01)
*G05B 19/19* (2006.01)
(Continued)

(52) U.S. Cl.
CPC ........... *G05B 19/416* (2013.01); *G05B 19/19* (2013.01); *G05B 19/404* (2013.01); *G05D 3/12* (2013.01); *H02P 29/40* (2016.02)

(58) Field of Classification Search
CPC .... G05B 19/416; G05B 19/19; G05B 19/404; G05D 3/12; H02P 29/40; H02P 23/04; H02P 23/20
(Continued)

(56) References Cited

U.S. PATENT DOCUMENTS 7,026,779 B2 * 4/2006 Eba .................. G05B 19/19
318/560
2002/0054450 A1 5/2002 Chu et al.
2006/0113946 A1 6/2006 Okita et al.

FOREIGN PATENT DOCUMENTS

EP 1496412 A1 1/2005
JP 6-091482 4/1994
(Continued)

OTHER PUBLICATIONS

Extended European Search Report dated Dec. 15, 2020 for the related European Patent Application No. 18899131.9.
(Continued)

*Primary Examiner* — David Luo
(74) *Attorney, Agent, or Firm* — McDermott Will & Emery LLP

(57) ABSTRACT

An electric motor control device includes a position controller, a command acceleration calculator, a first subtractor, and a second subtractor. The position controller receives a position command signal specifying a target position of the load and an electric motor position signal representing a position of the electric motor that drives the load, and outputs a torque command signal. The command acceleration calculator receives the position command signal and outputs a command acceleration signal representing acceleration of the position command signal. The first subtractor subtracts the command acceleration signal from a load acceleration signal representing acceleration of the load and outputs a load acceleration correction signal. The second
(Continued)

subtractor subtracts from the torque command signal a value obtained by multiplying the load acceleration correction signal by a predetermined weighting coefficient and outputs a torque command correction signal. The torque command correction signal controls a current supplied to a stator winding wire of the electric motor.

3 Claims, 4 Drawing Sheets

(51) Int. Cl.
  *G05B 19/404* (2006.01)
  *G05D 3/12* (2006.01)
  *H02P 29/40* (2016.01)
(58) Field of Classification Search
  USPC .................................................. 318/567, 560
  See application file for complete search history.

(56) References Cited

FOREIGN PATENT DOCUMENTS

| JP | 2006-158026 | 6/2006 |
| JP | 2008-043132 | 2/2008 |

OTHER PUBLICATIONS

D. Verscheure et al., "Vibration and motion control design and trade-off for high-performance mechatronic systems," Intelligent Control, 2006, IEEE International Symposium on, IEEE, PI, Oct. 4, 2006, pp. 1115-1120, XP031388688.

Bayan Babakhan et al., "A Comparison of the Performance Improvement by Collocated and Noncollocated Active Damping in Motion Systems," IEEE/ ASME Transactions on Mechatronics, IEEE Service Center, Piscataway, NJ, US, vol. 18, No. 3, Jun. 2013, pp. 905-913, XP011488096.

International Search Report of PCT application No. PCT/JP2018/046683 dated Feb. 26, 2019.

\* cited by examiner

CONTROL DEVICE FOR ELECTRIC MOTOR

TECHNICAL FIELD

The present invention relates to an electric motor control device that controls, with respect to a mechanical load driven by the electric motor, a driving operation of the electric motor with respect to a speed, a position, or the like. In particular, the present invention relates to an electric motor control device including a control configuration for suppressing vibration caused by antiresonance of a mechanical load when the mechanical load is being driven.

BACKGROUND ART

This type of electric motor control device internally has a feedback control system so that a position command having been input from a high-level controller can coincide with positions of the electric motor and a control target load (in other words, a mechanical load). Such an electric motor control device controls the positions of the electric motor and the control target load (mechanical load) as follows. The electric motor control device calculates, from the position command and a detection value of a position of the electric motor, a torque command value for making the position command coincide with the position of the electric motor, and the electric motor control device controls a current supplied to a stator winding wire of the electric motor in such a manner that the electric motor can generate the same torque as that of a torque command value. However, if a mechanical rigidity of a joint part between the electric motor and the control target load (mechanical load) is low, vibration tends to occur due to antiresonance on the control target load (mechanical load) at a time of acceleration or deceleration or when external disturbance is applied. Therefore, it is considered as an object to further improve settling property and external disturbance suppression performance compared to the conventional level.

To address this object, a conventional feed control device is configured as follows to suppress the vibration occurring on a control target load (mechanical load) at the time of acceleration or deceleration or when an external disturbance is applied. An acceleration sensor is provided on a slider that is the control target load (mechanical load), and an acceleration feedback loop is provided in which a detected acceleration value of the control target load (mechanical load) is multiplied by an acceleration feedback gain functioning as a weighting coefficient and in which a result of the multiplication is subtracted from the torque command value (for example, see PTL 1).

In a configuration represented in PTL 1 or the like, as the acceleration feedback gain is set larger, vibration depending on the mechanical rigidity becomes smaller. On the other hand, a torque necessary to accelerate or decelerate the load is subtracted from the torque command value. Therefore, there is a problem that command follow-up performance is deteriorated, thereby causing operation delay, overshoot, undershoot, or the like just before stopping and that it is impossible to satisfy both of settling property and vibration suppression. In other word, there is a trade-off relation between an acceleration feedback gain (acceleration feedback amount) and command follow-up performance, and more improvement is demanded to satisfy both of settling property and vibration suppression.

CITATION LIST

Patent Literature

PTL 1: Unexamined Japanese Patent Publication No. H6-91482

SUMMARY OF THE INVENTION

The present invention solves a conventional object. An object of the present invention is to provide an electric motor control device in which both of settling property and vibration suppression can be satisfied in the electric motor control device having a load acceleration feedback system, by obtaining a vibration suppression effect due to the load acceleration feedback while maintaining command follow-up performance. That is, by relaxing or removing a trade-off relation between a load acceleration feedback gain (acceleration feedback amount) and command follow-up performance, the present invention provides an electric motor control device in which a vibration suppression effect is enhanced by acceleration feedback from a load side and, at the same time, the command follow-up performance is maintained.

In order to solve the above object, the inventors of the present application have earnestly studied, making trials and errors. As a result, the inventors have conceived a novel electric motor control device in which the vibration suppression effect is enhanced by acceleration feedback from a load side and, at the same time, a command follow-up performance is maintained. The details will be described below.

A first aspect for solving the object is directed to an electric motor control device that drives a load (mechanical load), the electric motor control device including a position controller, a command acceleration calculator, a first subtractor, and a second subtractor. The position controller receives a position command signal specifying a target position of the load and an electric motor position signal representing a position of the electric motor that drives the load, and outputs a torque command signal. The command acceleration calculator receives the position command signal and outputs a command acceleration signal representing acceleration of the position command signal. The first subtractor subtracts the command acceleration signal from a load acceleration signal representing acceleration of the load and outputs a load acceleration correction signal. The second subtractor subtracts from the torque command signal a value obtained by multiplying the load acceleration correction signal by a predetermined weighting coefficient and outputs a torque command correction signal. The torque command correction signal controls a current supplied to a stator winding wire of the electric motor.

Further, in a second aspect, the command acceleration calculator generates, in the electric motor control device of the first aspect, a load speed signal by multiplying by a weighting coefficient a signal obtained by performing on the command acceleration signal a filtering process equivalent to a filtering process of a transfer characteristic of the electric motor position signal with respect to the position command signal.

Further, in a third aspect, the command acceleration calculator generates, in the electric motor control device of the first aspect, a load speed signal by multiplying by a weighting coefficient a signal obtained by performing on the command acceleration signal a filtering process equivalent to a filtering process of a transfer characteristic of the electric motor position signal with respect to the position command signal when the load and the electric motor are assumed to be rigid bodies.

By solving the above object, command acceleration information is previously subtracted from load acceleration information to be fed back in the electric motor control device having the load acceleration feedback system; therefore, it is possible to prevent reduction in an acceleration-deceleration torque due to the load acceleration feedback. Therefore, deterioration of the command follow-up performance due to the load acceleration feedback is not caused, a vibration suppression effect due to the load acceleration feedback can be enhanced while the command follow-up performance is maintained. Therefore, it is possible to satisfy both of the settling property and the vibration suppression.

In the electric motor control device of the present invention, the command acceleration information is previously subtracted from the load acceleration information to be fed back. The electric motor control device of the present invention prevents reduction in the acceleration-deceleration torque due to the load acceleration feedback and can enhance the vibration suppression effect due to the load acceleration feedback while maintaining the command follow-up performance. Therefore, the electric motor control device of the present invention has a large industrial value.

DESCRIPTION OF EMBODIMENT

In the following, an exemplary embodiment of the present invention will be described with reference to the drawings. Note that the present invention is not limited to the exemplary embodiment.

Exemplary Embodiment

Figure 1:
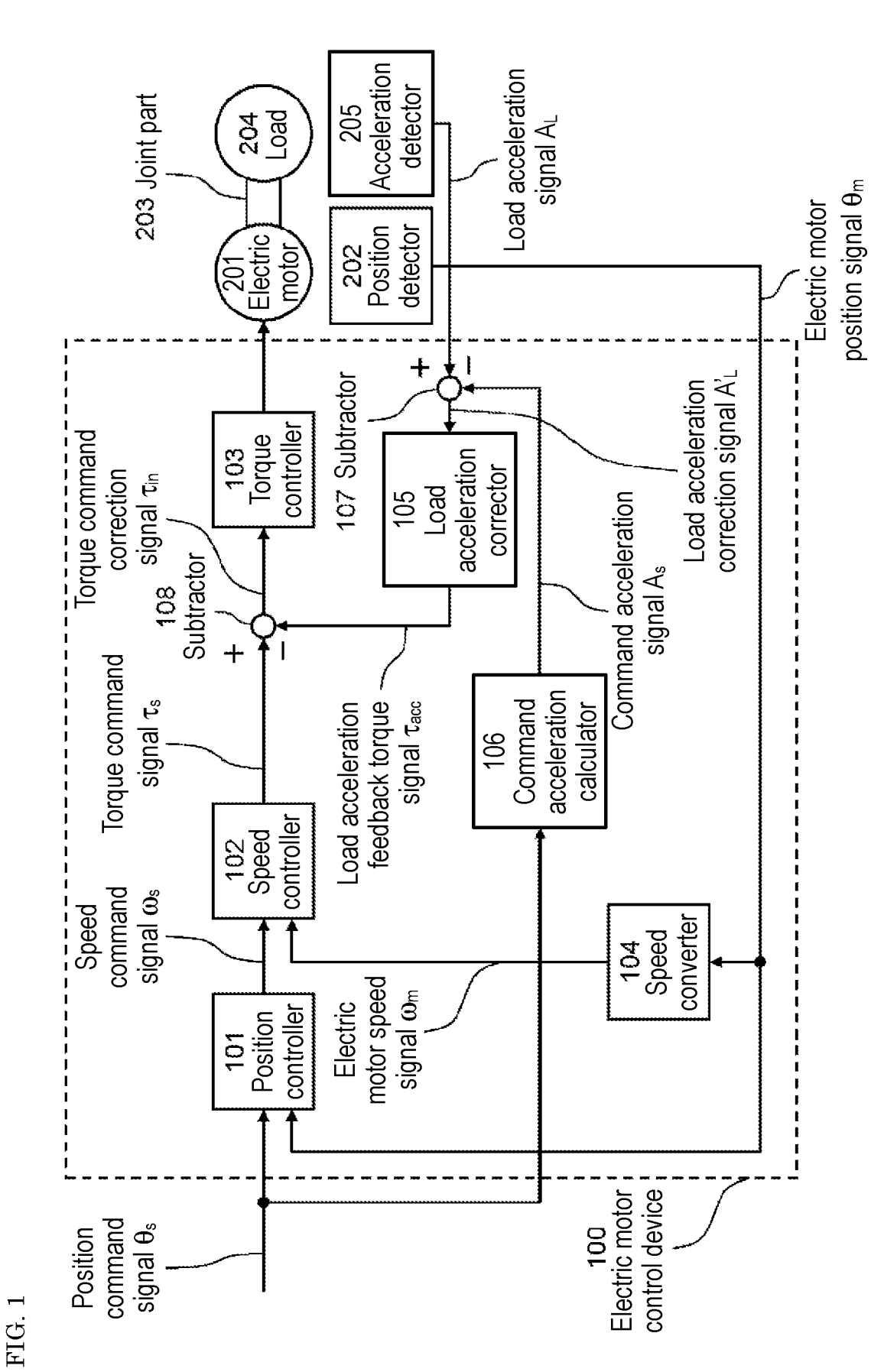
FIG. 1 is a diagram showing an example of a configuration of an electric motor control device in an exemplary embodiment of the present invention.

FIG. 1 is a diagram showing an example of a configuration of an electric motor control device in an exemplary embodiment of the present invention. Electric motor control device 100 shown in FIG. 1 is connected to electric motor 201, position detector 202 that detects a position of electric motor 201, and acceleration detector 205 that detects acceleration of load 204, which is a driving target and is connected to electric motor 201 via joint part 203. To electric motor control device 100, a position command signal is input from a high-level controller (not shown), and electric motor control device 100 controls a current supplied to a stator winding wire of the electric motor in such a manner that the position command signal coincides with positions of the electric motor and a load.

Position detector 202 detects the position of the electric motor and outputs the detected position as electric motor position signal $\theta_m$ to electric motor control device 100.

Acceleration detector 205 detects acceleration of the load and outputs the detected acceleration to electric motor control device 100 as load acceleration signal $A_L$.

A configuration of electric motor control device 100 will be described. Electric motor control device 100 internally has position controller 101, speed controller 102, torque controller 103, speed converter 104, load acceleration corrector 105, command acceleration calculator 106, subtractor 107, and subtractor 108.

Position controller 101 receives position command signal $\theta_S$ and electric motor position signal $\theta_m$, and outputs speed command signal $\omega_S$. Speed controller 102 receives speed command signal $\omega_S$ and electric motor speed signal $\omega_m$ calculated from electric motor position signal $\theta_m$ by speed converter 104, and outputs torque command signal $\tau_S$. Torque controller 103 receives torque command correction signal $\tau_{in}$ obtained by subtracting from torque command signal $\tau_S$ load acceleration feedback torque signal $\tau_{ace}$ to be described later, and controls a current supplied to a stator winding wire of the electric motor in such a manner that the electric motor generates the same torque as that of torque command correction signal $\tau_{in}$.

Command acceleration calculator 106 receives position command signal $\theta_S$ and outputs command acceleration signal $A_S$ representing acceleration of the position command.

Load acceleration corrector 105 receives load acceleration correction signal $A'_L$ obtained by subtracting command acceleration signal $A_S$ from load acceleration signal $A_L$ and outputs load acceleration feedback torque signal $\tau_{ace}$.

As described above, electric motor control device 100 internally has a cascade-type feedback control system in which the electric motor position, the electric motor speed, and the load speed are fed back in such a manner that the position command coincides with the positions of the electric motor and the load.

Next, a configuration of the electric motor control device will be described in detail. Position controller 101 receives position command signal $\theta_s$ and electric motor position signal $\theta_m$, and outputs speed command signal $\omega_s$ for reducing the difference between position command signal $\theta_s$ and electric motor position signal $\theta_m$. Position controller 101 performs, for example, a proportional control calculation in which a result of multiplying position command signal $\theta_s$ and electric motor position signal $\theta_m$ by a weighting coefficient is output as speed command signal $\omega_s$. Position controller 101 performs, for example, a proportional control calculation in which a result of multiplying a difference value between position command signal $\theta_s$ and electric motor position signal $\theta_m$ by a weighting coefficient is output as speed command signal $\omega_s$.

Speed controller 102 receives speed command signal $\omega_s$ and electric motor speed signal $\omega_m$, and outputs torque command signal $\tau_s$ for reducing the difference between speed command signal $\omega_s$ and electric motor speed signal $\omega_m$. Speed controller 102 performs, for example, a proportional integral operation in which an additional value of the following two values is output as torque command signal $\tau_S$: a value obtained by multiplying a difference value between speed command signal $\omega_S$ and electric motor speed signal $\omega_m$ by a weighting coefficient; and a value obtained by multiplying an integral value of a difference value between speed command signal $\omega_S$ and electric motor speed signal $\omega_m$ by a weighting coefficient.

Speed converter 104 receives electric motor position signal $\theta_m$ and outputs electric motor speed signal $\omega_m$ representing an electric motor speed. Speed converter 104 performs, for example, a differential operation on electric motor position signal $\theta_m$ and outputs the result of the differential operation as electric motor speed signal $\omega_m$.

Command acceleration calculator 106 receives position command signal $\theta_S$ and outputs command acceleration signal $A_S$ representing acceleration of position command signal $\theta_S$. Command acceleration calculator 106 calculates command acceleration signal $A_S$ by performing, for example, a second-order differential operation on position command signal $\theta_S$.

Subtractor 107 subtracts command acceleration signal $A_S$ from load acceleration signal $A_L$ and outputs load acceleration correction signal $A'_L$. Load acceleration corrector 105 receives load acceleration correction signal $A'_L$ and outputs, as load acceleration feedback torque signal $\tau_{ace}$, a value obtained by multiplying load acceleration correction signal $A'_L$ by a weighting coefficient.

Subtractor 108 outputs a value obtained by subtracting load acceleration feedback torque signal $\tau_{ace}$ from torque command signal $\tau_S$, as torque command correction signal $\tau_{in}$ to torque controller 103.

Load acceleration corrector 105 is configured to output, as load acceleration feedback torque signal $\tau_{ace}$, a value obtained by multiplying by a weighting coefficient load acceleration correction signal $A'_L$ obtained by subtracting command acceleration signal $A_S$ from load acceleration signal $A_L$. Assuming that if a value obtained by multiplying load acceleration signal $A_L$ by a weighting coefficient is output as load acceleration feedback torque signal $\tau_{ace}$, load acceleration feedback torque signal $\tau_{ace}$ is subtracted from torque command signal $\tau_S$ to make electric motor position signal $\theta_m$ or load position $\theta_L$ follow position command signal $\theta_S$ when the electric motor or the load is accelerated or decelerated. In this case, load acceleration feedback torque signal $\tau_{ace}$ is subtracted from a torque that is contained in torque command signal $\tau_S$ and is necessary for an acceleration-deceleration operation. An action when load acceleration feedback torque signal $\tau_{ace}$ has been subtracted from torque command signal $\tau_s$ will be described together with a working principle of load acceleration corrector 105.

Figure 2:
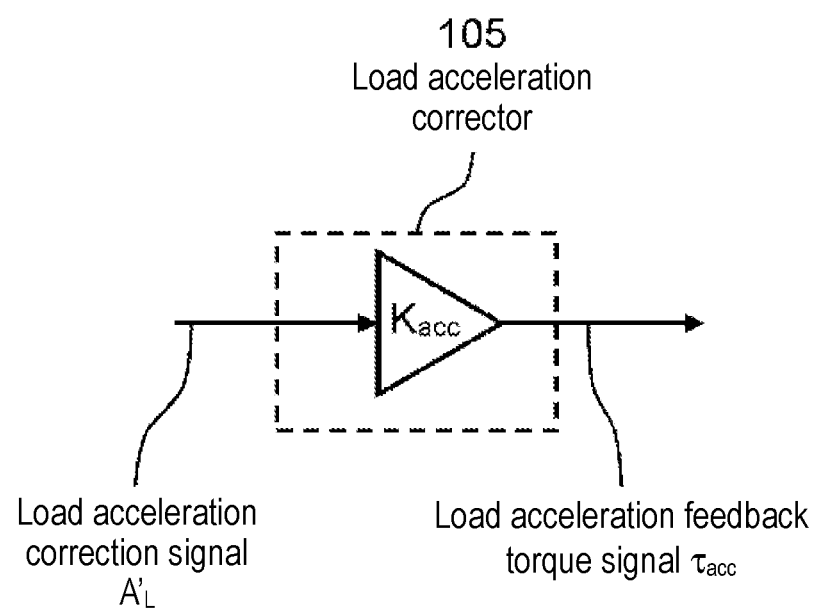
FIG. 2 is a diagram showing an example of a configuration of a load acceleration corrector in the exemplary embodiment of the present invention.

FIG. 2 is a diagram showing an example of a configuration of load acceleration corrector 105 in the exemplary embodiment of the present invention. Load acceleration corrector 105 receives load acceleration correction signal $A'_L$ and outputs, as load acceleration feedback torque signal $\tau_{ace}$, a value obtained by multiplying load acceleration correction signal $A'_L$ by load acceleration feedback gain $K_{ace}$, which is a weighting coefficient. At this time, assuming that command acceleration signal $A_S=0$, a transfer function $G_{\tau S \to \theta m}(s)$ of electric motor position signal $\theta_m$ with respect to torque command signal $\tau_S$ is represented by Equation (1). A transfer function $G_{\tau S \to \theta L}(\ )$ of load position $\theta_L$ with respect to torque command signal is represented by Equation (2).

[Mathematical Expression 1]

$$G_{\tau S \to \theta m}(s) = \frac{1}{(J_m + J_L + K_{acc}) \cdot s^2} \cdot \frac{\frac{1}{\omega_z^2} \cdot s^2 + 1}{\frac{1}{\omega_p'^2} \cdot s^2 + 1} \quad (1)$$

[Mathematical Expression 2]

$$G_{\tau S \to \theta L}(s) = \frac{1}{(J_m + J_L + K_{acc}) \cdot s^2} \cdot \frac{1}{\frac{1}{\omega_p'^2} \cdot s^2 + 1} \quad (2)$$

[Mathematical Expression 3]

$$\omega_p' = \sqrt{\frac{J_m + J_L + K_{acc}}{J_m \cdot J_L} \cdot K_s} \quad (3)$$

[Mathematical Expression 4]

$$\omega_Z = \sqrt{\frac{K_s}{J_L}} \quad (4)$$

The variables and the operators in the equations will be described. s is a Laplace operator. $J_m$ is inertia of electric motor 201. $J_L$ is inertia of load 204. $\omega'_P$ is a resonance frequency of a transfer characteristic from torque command signal $\tau_S$ to electric motor position signal $\theta_m$. $\omega_Z$ is an antiresonance frequency of a transfer characteristic from torque command signal $\tau_S$ to electric motor position signal $\theta_m$. A relation between load acceleration feedback gain $K_{ace}$ and resonance frequency $\omega'_P$ is represented by Equation (3). A relation among elastic modulus $K_S$, inertia $J_L$, of load 204, and antiresonance frequency $\omega_Z$ is represented by Equation (4). In Equations (3) and (4), $K_S$ represents the elastic modulus of joint part 203. When load 204 is driven by electric motor control device 100 via electric motor 201, vibration at antiresonance frequency $\omega_z$ is excited on load 204 by an acceleration-deceleration operation, and the vibration is a cause for deteriorating settling property at the time of stopping.

Equation (1) shows that when load acceleration feedback gain $K_{ace}$ is increased, resonance frequency $\omega'_p$ becomes larger, but antiresonance frequency $\omega_z$ does not change. As the difference between the resonance frequency and the antiresonance frequency becomes larger, the gain at the antiresonance frequency becomes smaller, so that an effect of the antiresonance becomes smaller. On the other hand, Equations (1) and (2) show that the relation between electric motor position signal $\theta_m$ and load position $\theta_L$ with respect to torque command signal $\tau_S$ is the relation represented by the next Equation (5).

[Mathematical Expression 5]

$$\frac{\theta_L(s)}{\theta_m(s)} = \frac{1}{\frac{1}{\omega_z^2} \cdot s^2 + 1} \quad (5)$$

Equation (5) shows that the relation between electric motor position signal $\theta_m$ and load position $\theta_L$ is constant regardless of load acceleration feedback gain $K_{ace}$. Therefore, when the gain of the transfer characteristic of electric motor position signal $\theta_m$ with respect to torque command signal $\tau_s$ at antiresonance frequency $\omega_z$ becomes smaller due to load acceleration feedback gain $K_{ace}$ being increased in Equation (1), the gain of the transfer characteristic of load position $\theta_L$ with respect to torque command signal $\tau_s$ at antiresonance frequency $\omega_z$ becomes accordingly smaller. As a result, the vibration of load 204 at antiresonance frequency $\omega_z$ caused by an acceleration-deceleration operation also becomes smaller.

As described above, with the load acceleration being fed back by load acceleration corrector 105, the gain, in other words, the sensitivity at the antiresonance frequency is reduced as shown by the above Equations. As a result, when electric motor control device 100 is used to drive electric motor 201 or load 204, it is possible to reduce the antiresonant vibration caused on load 204 at the time of an acceleration-deceleration operation.

As described above, by causing load acceleration corrector 105 to feed back load acceleration signal $A_L$, it is possible to obtain an effect of suppressing the vibration due to the antiresonance.

On the other hand, in a case where load acceleration feedback torque signal $\tau_{ace}$ is calculated with load acceleration signal $A_L$ being directly input into load acceleration corrector 105 without command acceleration signal $A_S$ being subtracted from load acceleration signal $A_L$ when an acceleration-deceleration operation is performed to make electric motor position signal $\theta_m$ and load acceleration signal $A_L$ follow position command signal $\theta_S$, there is caused a problem that the settling property is deteriorated due to the load acceleration feedback.

When an acceleration-deceleration operation is performed, control needs to be performed in such a manner that the electric motor generates torque proportional to a desired acceleration. In electric motor control device 100, the torque necessary for the acceleration-deceleration operation is calculated by position controller 101 and speed controller 102, and is output as torque command signal $\tau_S$. However, when load acceleration feedback torque signal $\tau_{ace}$ is calculated with load acceleration signal $A_L$ being directly input to load acceleration corrector 105 without command acceleration signal $A_S$ being subtracted from load acceleration signal $A_L$, the torque necessary for the acceleration-deceleration operation is also reduced because load acceleration feedback torque signal $\tau_{ace}$ is subtracted from torque command signal $\tau_S$. As a result, the command follow-up performance is deteriorated. The amount of a shortage of the torque necessary for the acceleration-deceleration operation is compensated again by position controller 101 and speed controller 102, so that control is performed in such a manner that electric motor position signal $\theta_m$ and load position $\theta_L$ coincide with position command signal $\theta_S$. However, since position controller 101 and speed controller 102 perform feedback control, a delay occurs in the control. This delay in the control causes operation delay, overshoot, undershoot, or the like just before stopping, thereby deteriorating the settling property. That is, as the load acceleration feedback gain (acceleration feedback amount) is increased, the command follow-up performance becomes lower. There is a trade-off relation between the load acceleration feedback gain (acceleration feedback amount) and the command follow-up performance.

Load acceleration feedback torque signal $\tau_{ace}$ is calculated by inputting to load acceleration corrector 105 load acceleration correction signal $A'_L$ obtained by previously subtracting command acceleration signal $A_S$ representing the acceleration at the time of the acceleration-deceleration operation from load acceleration signal $A_L$ to be fed back, so that the torque necessary for the acceleration-deceleration operation of electric motor 201 and load 204 is not reduced by the load acceleration feedback. Therefore, an effect of improving operation delay, overshoot, undershoot, or the like just before stopping is provided.

As described above, in the present exemplary embodiment, by previously subtracting, in the electric motor control device internally having the load acceleration feedback system, command acceleration information from load acceleration information to be fed back, it is possible to prevent reduction in an acceleration-deceleration torque due to the load acceleration feedback. Therefore, the vibration suppression effect is achieved due to the load acceleration feedback, and, at the same time, the command follow-up performance is maintained. As a result, it is possible to satisfy both of the settling property and the vibration suppression.

Figure 3:
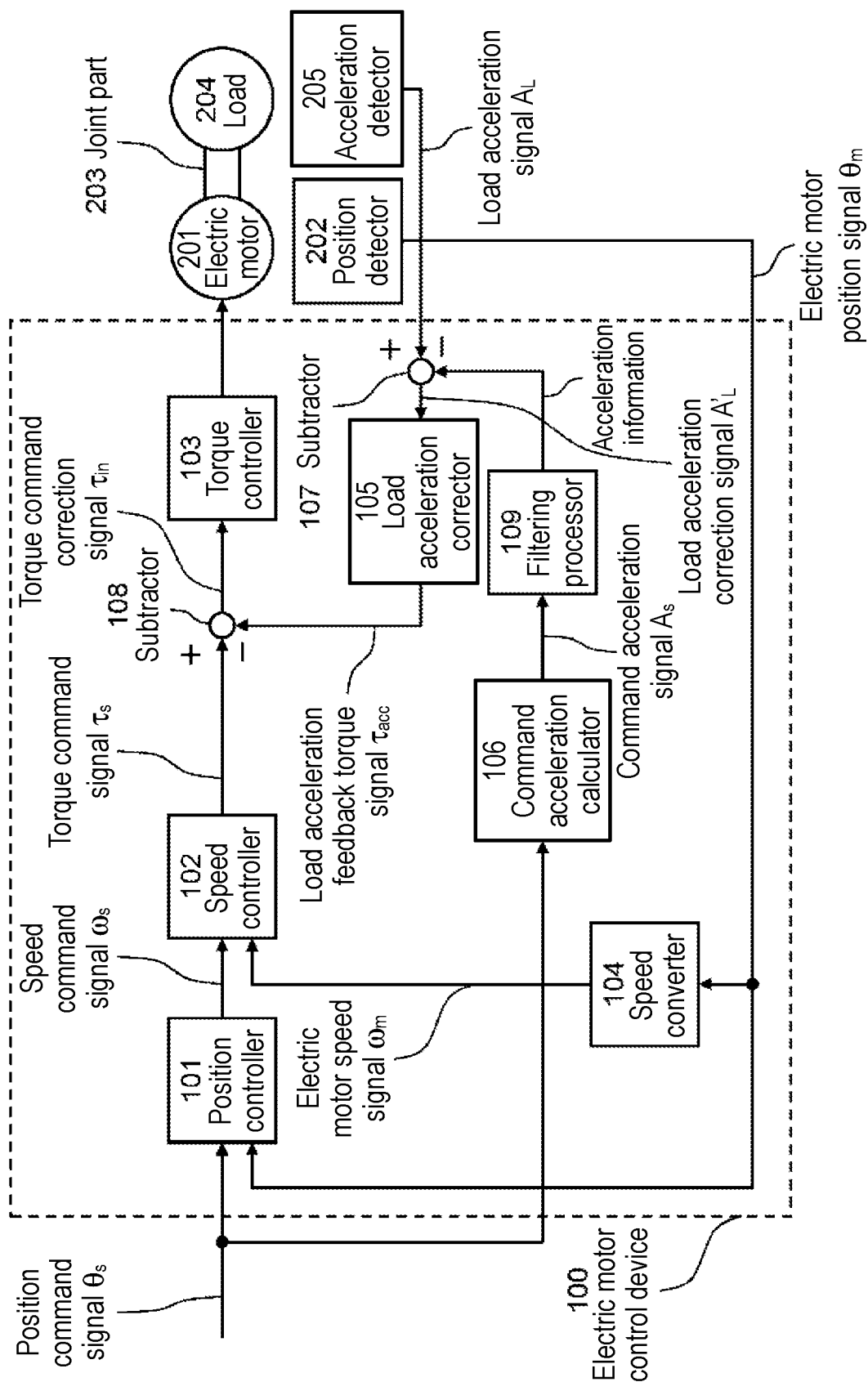
FIG. 3 is a diagram showing another example of the configuration of the electric motor control device in the exemplary embodiment of the present invention.

In the present exemplary embodiment, a result of subtracting command acceleration from the load acceleration is fed back. However, acceleration information obtained by performing on the command acceleration a filtering process equivalent to the transfer characteristic of the electric motor position signal with respect to the position command signal may be subtracted from the load acceleration. FIG. 3 is a diagram showing another example of the configuration of the electric motor control device in the exemplary embodiment of the present invention. In FIG. 3, the components identical to those in FIG. 1 are given the same reference marks and are not described again. In filtering processor 109 of electric motor control device 100 shown in FIG. 3, after a filtering process equivalent to the transfer characteristic of the electric motor position signal with respect to the position command signal is performed, the acceleration information is output. By employing the above configuration, acceleration when an acceleration-deceleration operation is actually performed is previously subtracted from the load acceleration information to be fed back, so that it is possible to prevent reduction in the acceleration-deceleration torque due to the load acceleration feedback. Therefore, the vibration suppression effect is achieved due to the load acceleration feedback, and, at the same time, the command follow-up performance is further maintained. As a result, it is possible to satisfy both of the settling property and the vibration suppression.

In the present exemplary embodiment, a result of subtracting command acceleration from the load acceleration is fed back. However, the following acceleration information may be subtracted from the load acceleration. The acceleration information is obtained by performing on the command acceleration a filtering process equivalent to the transfer characteristic of the electric motor position with respect to the position command signal when a joint part between the electric motor and the load is assumed to be highly rigid, in other words, when the electric motor and the load are assumed to be rigid bodies. In this case, in filtering processor 109 of electric motor control device 100 shown in FIG. 3, a filtering process is performed which is equivalent to the transfer characteristic of the electric motor position with respect to the position command signal when a joint part between the electric motor and the load is assumed to be highly rigid, in other words, when the electric motor and the load are assumed to be rigid bodies, and the acceleration information is then output. By employing the above configuration, acceleration when an acceleration-deceleration operation is actually performed is previously subtracted from the load acceleration information to be fed back, so that it is possible to prevent reduction in the acceleration-deceleration torque due to the load acceleration feedback. Therefore, the vibration suppression effect is achieved due to the load acceleration feedback, and, at the same time, the command follow-up performance is further maintained. As a result, it is possible to satisfy both of the settling property and the vibration suppression.

As described above, electric motor control device 100 of the present exemplary embodiment is electric motor control device 100 that drives a load (mechanical load) and includes position controller 101, command acceleration calculator 106, subtractor 107 corresponding to a first subtractor, and subtractor 108 corresponding to a second subtractor. Position controller 101 receives position command signal $\theta_s$ specifying a target position of the load and electric motor position signal $\theta_m$ representing a position of the electric motor, and outputs torque command signal $\tau_S$. Command acceleration calculator 106 receives position command signal $\theta_S$ and outputs command acceleration signal $A_S$ representing acceleration of position command signal $\theta_S$. The first subtractor subtracts command acceleration signal $A_S$ from load acceleration signal $A_L$ representing acceleration of the load, and outputs load acceleration correction signal $A'_L$. The second subtractor subtracts from torque command signal $\tau_S$ a value obtained by multiplying load acceleration correction signal $A'_L$ by a predetermined weighting coefficient, and outputs torque command correction signal $\tau_{in}$. Torque command correction signal $\tau_{in}$ controls a current supplied to a stator winding wire of the electric motor.

With this configuration, command acceleration information is previously subtracted from load acceleration information to be fed back in electric motor control device 100 internally having the load acceleration feedback system; therefore, it is possible to prevent reduction in an acceleration-deceleration torque due to the load acceleration feedback. Therefore, the vibration suppression effect is achieved due to the load acceleration feedback, and, at the same time, the command follow-up performance is maintained. As a result, it is possible to satisfy both of the settling property and the vibration suppression.

Figure 4:
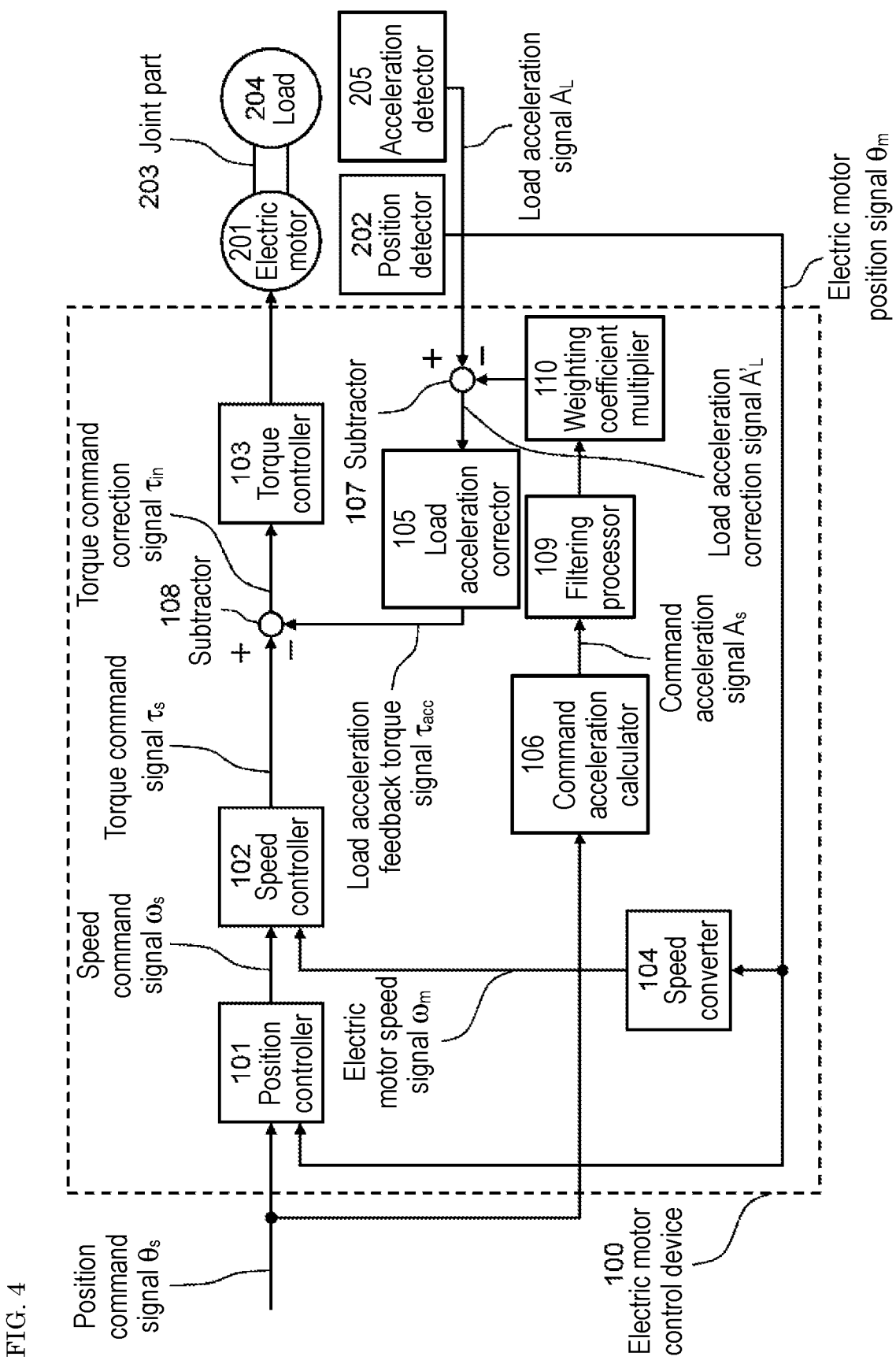
FIG. 4 is a diagram showing still another example of the configuration of the electric motor control device in the exemplary embodiment of the present invention.

Further, command acceleration calculator 106 may generate the load speed signal by multiplying by a weighting coefficient a signal obtained by performing on command acceleration signal $A_S$ a filtering process equivalent to the filtering process of a transfer characteristic of electric motor position signal $\theta_m$ with respect to position command signal $\theta_s$. FIG. 4 is a diagram showing still another example of the configuration of the electric motor control device in the exemplary embodiment of the present invention. In FIG. 4, the components identical to those in FIG. 3 are given the same reference marks and are not described again. In weighting coefficient multiplier 110 of electric motor control device 100 shown in FIG. 4, a weighting coefficient is multiplied to a signal obtained by performing a filtering process in filtering processor 109. Note that command acceleration calculator 106 may include filtering processor 109 and weighting coefficient multiplier 110.

Further, command acceleration calculator 106 may generate the load speed signal by multiplying by a weighting coefficient a signal obtained by performing on command acceleration signal $A_S$ a filtering process equivalent to the filtering process of a transfer characteristic of electric motor position signal $\theta_m$ with respect to position command signal $\theta_s$ when the load and the electric motor are assumed to be rigid bodies. In filtering processor 109 of electric motor control device 100 shown in FIG. 4, a filtering process is performed which is equivalent to the transfer characteristic of the electric motor position with respect to the position command signal when a joint part between the electric motor and the load is assumed to be highly rigid, in other words, when the electric motor and the load are assumed to be rigid bodies, and the signal is then output. In weighting coefficient multiplier 110 of electric motor control device 100 shown in FIG. 4, a weighting coefficient is multiplied to a signal obtained by performing a filtering process in filtering processor 109. Note that command acceleration calculator 106 may include filtering processor 109 and weighting coefficient multiplier 110.

INDUSTRIAL APPLICABILITY

As described above, the electric motor control device according to the present invention provides the vibration suppression effect due to the load acceleration feedback while maintaining the command follow-up performance. Therefore, it is possible to satisfy both of the settling property and the vibration suppression. By relaxing or removing a trade-off relation between a load acceleration feedback gain (acceleration feedback amount) and a command follow-up performance, it is possible to provide an electric motor control device in which a vibration suppression effect is enhanced by acceleration feedback from a load side and, at the same time, the command follow-up performance is maintained. Therefore, the present invention is suitable for applications such as an electric motor control device used for semiconductor manufacturing equipment, an electronic component mounter, and the like.

REFERENCE MARKS IN THE DRAWINGS

100: electric motor control device
101: position controller
102: speed controller
103: torque controller
104: speed converter
105: load acceleration corrector
106: command acceleration calculator
107: subtractor
108: subtractor
109: filtering processor
110: weighting coefficient multiplier
201: electric motor
202: position detector
203: joint part
204: load
205: acceleration detector

The invention claimed is:

1. An electric motor control device that drives a load, the electric motor control device comprising:
   a position controller that receives a position command signal specifying a target position of the load and an electric motor position signal representing a position of the electric motor that drives the load and outputs a torque command signal;
   a command acceleration calculator that receives the position command signal and outputs a command acceleration signal representing acceleration of the position command signal;
   a first subtractor that subtracts the command acceleration signal from a load acceleration signal representing acceleration of the load and outputs a load acceleration correction signal; and
   a second subtractor that subtracts from the torque command signal a value obtained by multiplying the load acceleration correction signal by a predetermined weighting coefficient and outputs a torque command correction signal,
   wherein the torque command correction signal controls a current supplied to a stator winding wire of the electric motor.

2. The electric motor control device according to claim 1, wherein the command acceleration calculator generates a load speed signal by multiplying by a weighting coefficient a signal obtained by performing on the command acceleration signal a filtering process equivalent to a filtering process of a transfer characteristic of the electric motor position signal with respect to the position command signal.

3. The electric motor control device according to claim 1, wherein the command acceleration calculator generates a load speed signal by multiplying by a weighting coefficient a signal obtained by performing on the command acceleration signal a filtering process equivalent to a filtering process of a transfer characteristic of the electric motor position signal with respect to the position command signal when the load and the electric motor are assumed to be rigid bodies.

* * * * *